May 7, 1968  R. W. DUNN  3,381,557

METHOD AND APPARATUS FOR CUTTING THREADS

Filed Sept. 16, 1965  3 Sheets-Sheet 1

INVENTOR
Richard W. Dunn
BY
Wood, Herron and Evans
ATTORNEYS

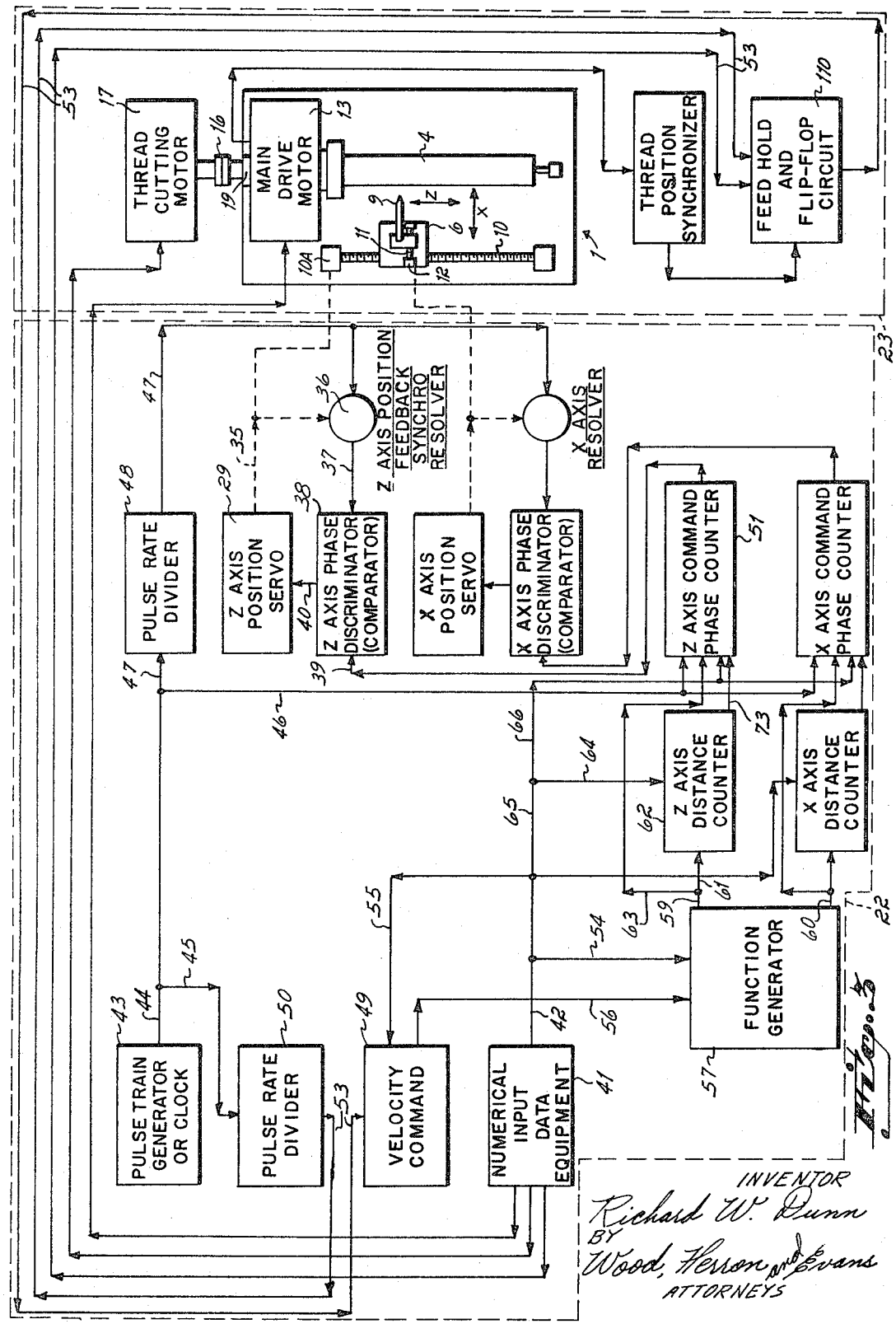

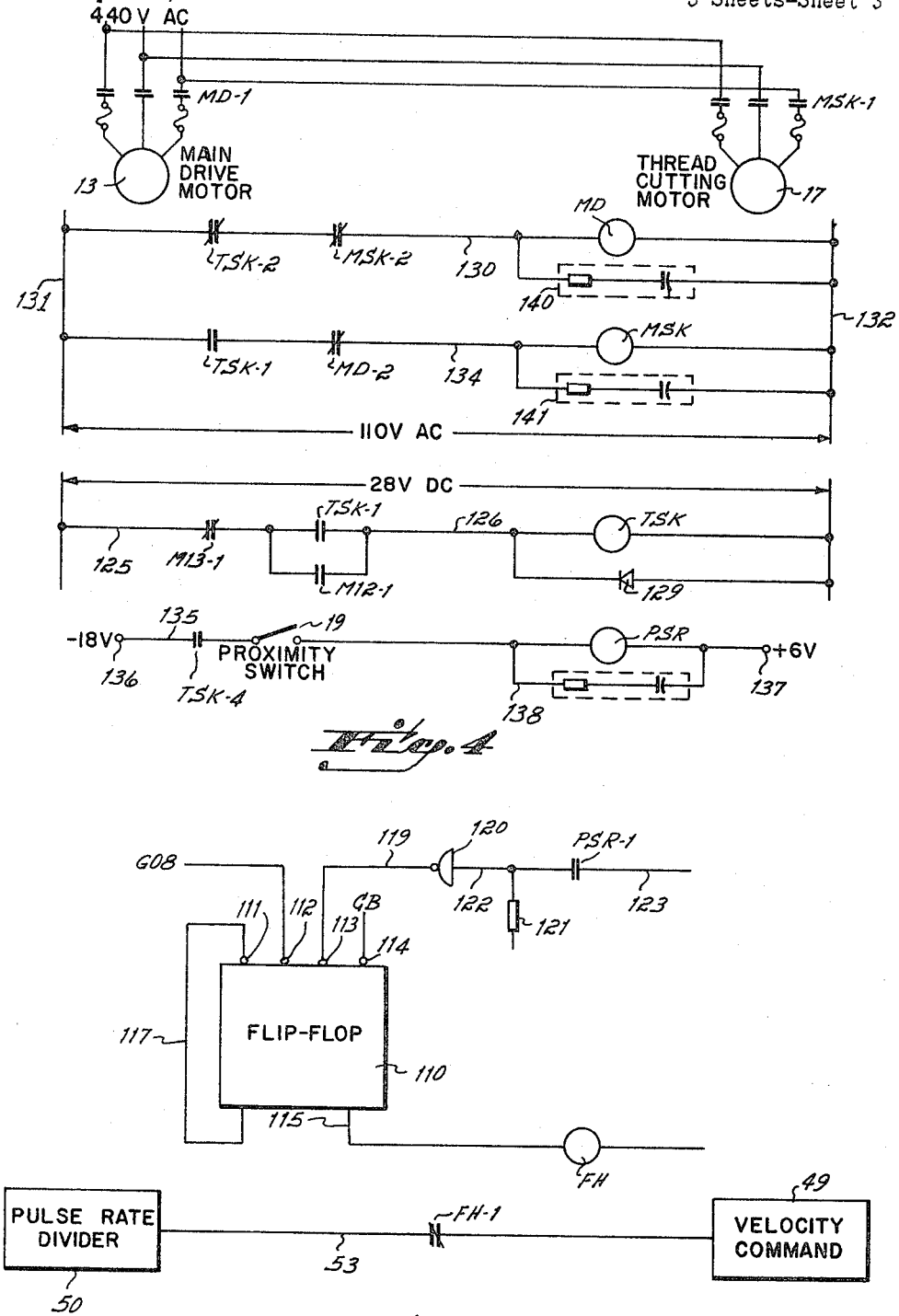

3,381,557
METHOD AND APPARATUS FOR
CUTTING THREADS
Richard W. Dunn, 20 Orient Ave.,
Melrose, Mass. 02176
Filed Sept. 16, 1965, Ser. No. 497,582
(Filed under Rule 47(b) and 35 U.S.C. 118)
7 Claims. (Cl. 82—5)

ABSTRACT OF THE DISCLOSURE

A thread chasing control apparatus for cutting a thread upon a workpiece in a numerically controlled machine tool. This apparatus comprises a synchronous motor for driving the workpiece in rotation during the thread chasing operation and utilizes the numerical control system to control tool movements during the thread cutting operation independently of the rotational speed of the workpiece. A feed hold circuit and proximity switch cooperate in a control circuit to fix the angular position of the workpiece at which the thread chasing operation is initiated.

---

This invention relates to thread cutting and more particularly to a novel method and apparatus for cutting threads upon a workpiece.

Threads are cut upon a workpiece by moving a tool axially of the workpiece at a predetermined longitudinal rate while the workpiece rotates. The resulting thread lead (inches per revolution) is equal to the longitudinal tool velocity (inches per minute) divided by the spindle speed (revolutions per minute).

In order to cut an accurate thread, i.e., a thread having an accurate lead, it has always been conventional to synchronize the longitudinal tool movement with the speed of workpiece rotation so that a change in one was reflected in the other. For this reason the tool feed or longitudinal movement was linked mechanically to the spindle of workpiece drive by a gear connection. More recently, in the case of numerically controlled thread cutting machines, this synchronization has been obtained by generating a signal from the spindle drive and utilizing this signal to control the tool feed.

This invention is predicated upon the concept that a very accurate thread may be cut on a numerically controlled machine tool by using independent drive systems for the spindle and the tool feed; in other words, by controlling the longitudinal tool feed independently of the workpiece rotation. However, the speed of work rotation is maintained in precise relationship to the tool feed by electrical synchronization resulting from the use of line frequency controlled spindle or workpiece drive and electrical oscillator or clock controlled tool feed drive.

More particularly, in one embodiment of the invention, a synchronous motor is used to drive the spindle at a predetermined speed which is a multiple of line frequency. The numerical control unit which controls the tool feed includes a signal pulse train generator or oscillator clock. This signal generator is effective to produce signals independent of but in timed relationship to the alternating current frequency. These signals in turn regulate the tool feed rate so that this rate is directly correlated with line frequency and there is maintained a precise relationship to the speed of work rotation.

In order to provide a clearer understanding of the invention, it will be described in connection with one specific control, the General Electric 100s control, although it will readily be appreciated that the invention is equally adaptable to other control systems. The 100s control is a relatively inexpensive numerical control system designed primarily for use in conjunction with production shaft lathes. One of the severe drawbacks of this particular control as applied to a shaft lathe is that it is not capable of cutting threads, a very common shaft turning function. Prior to this invention, anyone who desired to cut threads upon a numerically controlled lathe was required to purchase an elaborate and expensive control system. In fact, the thread cutting variety of control cost nearly twice as much as the less expensive 100s control. Therefore, it has been one objective of this invention to provide a thread-chasing attachment which may be added to an inexpensive numerical control so as to enable that control to perform the thread-chasing function.

Another objective of this invention has been to provide a thread-chasing control system in the form of an attachment which may be added to commercially available numerical control systems without modifying or changing the circuitry of the commercial control. It is common practice for manufacturers of numerical control systems to sell the control as a package and guarantee it for some period of time so long as no unauthorized personnel repair or modify the control. Therefore an attachment type of thread chaser is preferable to one which requires modification of the existing circuitry of the control.

Because the spindle speed of the invention is controlled by a synchronous motor independently of the tool feed, this invention has the advantage of being capable of being added in the form of an attachment to a commercially available numerical control system without modifying the circuitry of the commercial unit.

These and other objects and advantages of the invention of this application will be better understood from a description of the drawings in which:

FIGURE 3 is a block diagram of a numerical contouring control system incorporating the inventive thread cutting control of this application, FIGURE 4 is a circuit diagram of the thread control circuit, and FIGURE 5 is a diagrammatic circuit diagram of the feed hold flip flop control circuit.

Figure 1:
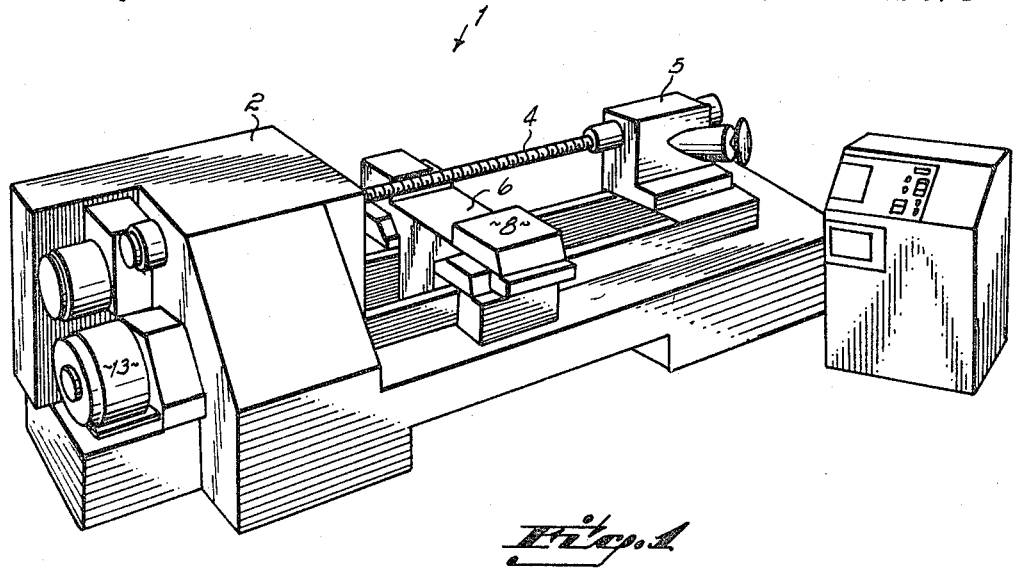
FIGURE 1 is a perspective view of a lathe and contouring control system.
Figure 2:
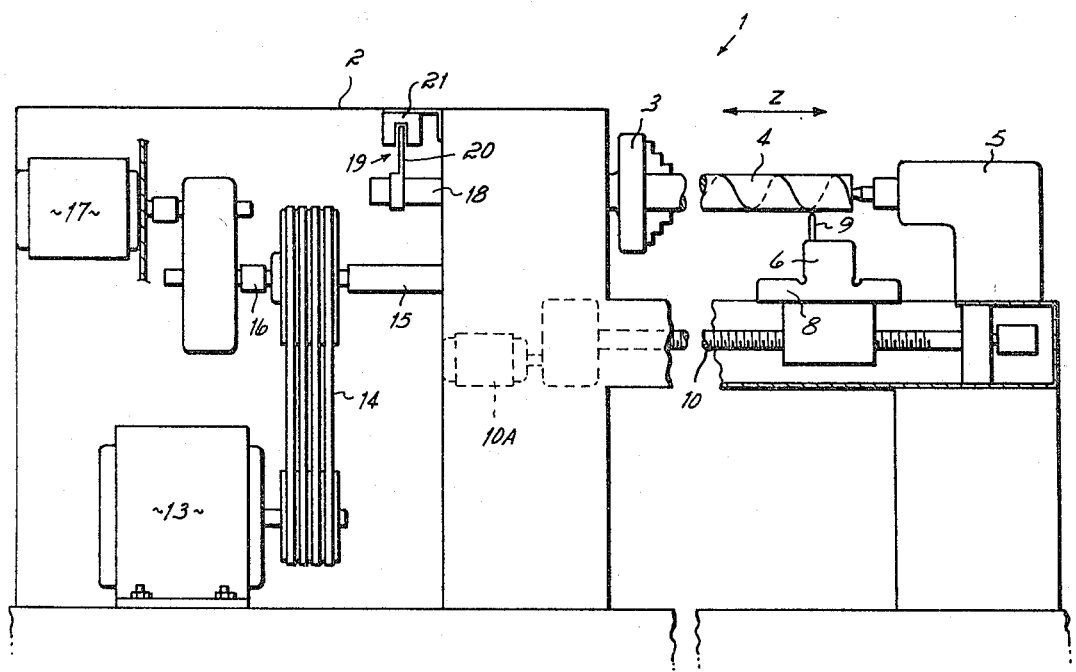
FIGURE 2 is a diagrammatic view of the lathe of FIGURE 1.

Referring first to FIGURES 1 and 2, there is shown a typical lathe 1 of the type upon which this control is intended to be used. It includes a head stock 2 having a chuck 3 attached to the head stock spindle for holding and rotating a work piece 4, and a tail stock 5 for further supporting the work piece. The lathe further includes a longitudinally movable carriage 6 which supports and carries a saddle 8 movable toward and away from the work piece 4. The saddle 8 in turn carries a tool 9 which follows the longitudinal movements of the carriage 6 and the transverse movement of the saddle 8, these directions being designated as the Z and X directions respectively. Motion along the Z axis is provided by rotation of the carriage lead screw 10 while motion along the X axis is provided by rotating the cross feed screw 11 (FIGURE 3). The lead screw 10 is driven by a feed motor 10A, while the cross feed screw is driven by a second feed motor 12.

The spindle 18 has two driving sources, one for ordinary turning and one for thread chasing. The power source for conventional contouring or turning is the main drive motor 13 which drives the spindle through a plurality of V belts 14 and a main drive shaft 15. Coupled to the main drive shaft via a clutch 16 is a synchronous motor 17, used to drive the spindle only during thread chasing. The synchronous motor 17 is coupled to the main drive shaft 15 through a conventional gear box. When spindle 18 is being driven by the main drive motor 13, the synchronous motor 17 is declutched. However, when the synchronous motor is used as a driving source, the main drive motor is also coupled to the spindle so that the synchronous motor not only must turn the work piece, but also the main drive motor. This load is not excessive though since during thread chasing, only a relatively small cut is taken in the work piece.

Also coupled to the spindle is a proximity switch 19. This switch provides a signal or pulse indicative of the rotational position of the spindle during each revolution of the spindle and work piece as a rotating finger 20 attached to the spindle 18 passes a magnetic pick-up head 21.

Referring now to FIGURE 3 and the block diagram of the control system used to control the lathe 1, it will be seen that the lathe control system has been divided into two sections, the two axes tool feed control section contained within the dotted line box 22, and the thread attachment control section contained within the dotted line box 23. One form of two axes tool feed control section, which is available in commercial form, is completely described in U.S. Patent No. 3,173,001, issued Mar. 9, 1965, to J. T. Evans. Therefore it will be only briefly described herein.

Essentially the tool feed system includes a servo loop for each of the two axes, X and Z, of the tool feed. The Z axis servo loop and the X axis servo loop are structurally independent of each other in their action in driving the feed mechanisms. Since the equipment throughout the system for the X coordinate is precisely the same as for the Z coordinate, solely the Z coordinate system will be described, except where a discussion of the equipment of both coordinates is required for clarification. The Z-coordinate servo loop comprises a Z-axis position servo 29, including a D.C. amplifier driving a servo motor which by its output shaft 35 controls feed motor 10A to actuate the Z-axis feed screw 10. Simultaneously, position servo shaft 35 drives the Z-axis position feed back synchro resolver 36. The output lead 37 of position feed back resolver 36 provides an electrical representation of the position of tool 9 in the Z-coordinate since both feed motor 10A and resolver 36 are driven in common by the position servo 29.

Lead 37 is coupled into the Z-axis phase discriminator or comparator 38. The discriminator's function is to compare the actual position of cutting tool 9, in the Z-coordinate, as represented by the Z-axis position feed back resolver 36, on the one hand, with the commanded position from the control section. Thus, the phase of the command signal entering the Z-axis phase discriminator 38 from the left on lead 39 is compared with the phase of the actual feed back position signal which comes into discriminator 38 from resolver 36. The difference in the phase between the command signal and the feed back signal is commensurate with the difference between the commanded position and the actual position. This phase difference is utilized for generating an error signal which is then fed into the servo mechanism 29 through lead 40. Servo mechanism 29 drives the Z-axis feed mechanism in accordance with the instantaneous error signal. The servo mechanism loop, therefore, comprises the Z-axis position servo 29, the Z-axis position feed back synchro resolver 36, and the Z-axis phase discriminator 38. Discriminator 38 is also common to the control section now briefly to be outlined.

The input to the control section of the overall numerical contouring control system is the numerical input data equipment block 41 which accepts numerical command data. Input equipment 41 may be a punched tape, punched card, or magnetic tape, digital input sub-system. For the purposes of the numerical contouring control system under discussion, punched tape has been found to be particularly advantageous. Numerical input data equipment 41 reads the instructions and addresses on the input tape so as to generate the appropriate electrical signals requisite for controlling the tool 9 and spindle 18. Typically, the numerical input information is in a coded digital form related to the speed with which the cutting tool 9 is to travel while performing its contouring function; it also indicates the X and Z departures and their direction for that cut, or the arc center offsets of the circular path to be generated if that particular cut is to be an arc of a circle. The instructions from input equipment 41 are then routed throughout the control section in accordance with the programmed addresses.

Another type of input is also provided for the control section 22 in the form of a train of pulses generated from a reference clock or oscillator 43. This pulse clock, as is well known in the digital computer art, provides the carrier by which the command signals are transported throughout the control section; it also provides a reference pulse rate input to the servo loop section. Thus, the output of the pulse train generator or clock 43 is applied along its output lead 44 to both the control section of the contouring system along leads 45 and 46, and also to the servo loop section on lead 47. Lead 47 is coupled to the input of the position feed back resolver 36 through the intermediary of a pulse rate divider 48, while the output from clock 43 is applied to the control section on lead 45 as an input to the velocity command block 49, through the intermediary of the pulse rate divider 50. There is no pulse rate divider in lead 46 between clock 43 and the Z-axis command phase counter 51. The insertion of pulse rate divider 50 in lead 45, and divider 48 in lead 47, as well as the absence of a pulse rate divider in lead 46, result in adapting the reference pulse rate from clock 43 for use in different parts of the system having different functions and operating characteristics.

The pulse rate fed into the control section, and the total number of pulses fed into the control section for any given path, define the commanded velocity with which it is desired the tool 9 shall move and the total length of the path it is desired that the tool 9 traverse. In short, the pulse rate and the total number of pulses are the mechanisms upon which the electronic equipment in the control section operate to provide command signals, subsequently to be converted into the velocity and distance of travel executed by the tool.

The function of the velocity command block 49 is to convert a reference pulse rate entering from the pulse rate divider 50 on lead 53 (FIGS. 3 and 5) into a pulse rate represented by a number (commensurate with required velocity of motion) punched into the input tape and fed into the system at input data equipment 41. This number is referred to as the feed rate number, and will hereinafter be explained in greater detail. The feed rate number is therefore applied from input 41 along leads 42 and 55 as another input to the velocity command 49. If the punched tape commands a feed rate number of 200 inches per minute, the velocity command from block 49 would operate upon the pulse rate on input lead 53 to provide an output pulse rate on lead 56 of 33.3 kilocycles per second (which is equal to 200 inches per minute with each pulse representing .0001 of a inch). Velocity command block 49 also performs the very important functions of manual feed rate over-ride and automatic acceleration and deceleration. The output pulse rate, commensurate with command velocity, is applied on lead 56 to the function generator 57.

The function generator operates in two modes. The first mode generates command signals for straight line cuts at any angle, sometimes referred to as slope generation or linear interpolation. The second mode generates command signals to perform circular line cuts with a specified radius, also referred to as circular interpolation.

For the purposes of discussion relative to FIGURE 3, consider function generator 57 in its relationship to the rest of the system operating solely in the first mode as a slope generator.

Function generator 57 resolves the command velocity entering on lead 56 into two component pulse rates commensurate with required velocities in the X and Z directions. This resolution is performed in accordance with the X and Z departures programmed into the punched tape and applied to the function generator 57 from input equipment 41 along the leads 42 and 54. Thus the input pulse rate to function generator 57 is multiplied by a factor which is directly proportional to the sine of the slope angle of the path cut relative to the X axis to obtain the required Z component of velocity, and is multiplied by the cosine of that angle in order to obtain the required X component of velocity. The X and Z outputs of function generator 57, therefore, are two pulse rates commensurate with the Z and X components of velocity required for the motion of the cutting tool. The X and Z pulse rates are applied as outputs on lead 60 and 59, respectively. Between 59 and 60, and the Z and X feed motors 10A and 12 of machine tool 1, the circuitry for handling the output on lead 59 is identical to that for the output on lead 60. Accordingly, the following discussion will be restricted to the Z coordinate system.

The Z pulse rate output on lead 59 from the function generator 57, is applied to two different circuits, simultaneously. Along lead 61 from lead 59, it is applied to the Z-axis distance counter 62, while along lead 63 from lead 59, it is applied to the Z-axis command phase counter 51. Distance counter 62 controls the length of the path along which the cutting tool 9 travels for the cut being made. Command phase counter 51 controls (relative to the position feed back resolver 36 through the intermediary of the discriminator 38) the velocity of motion of the tool 9 for the cut.

Since each pulse represents an incremental distance which the cutting tool 9 travels, counting the pulses in distance counter 62 that exit from function generator 57 is the same thing as measuring the distance which the cutting tool 9 travels along the path. When counter 62 totals a number of pulses equal to the desired path length, its operation stops as does the movement of cutting element 9. Counter 62 is informed at the beginning of each path, as to the total count required to achieve the desired path length. This input data is applied to counter 62 from input equipment 41 along leads 42 and 64.

The motion of the machine tool is controlled in the command phase counter 51. In command phase counter 51, not only is the required Z coordinate pulse rate applied thereto along lead 63, but the reference clock pulse rate is also applied as an input from clock 43 along leads 44 and 46. Consider what happens if the Z feed rate command requires no motion in the Z direction, and the simultaneous condition that the machine tool is at rest in correspondence with the command. Under these circumstances, the pulse rate output from function generator 57 on lead 59 is zero, thereby maintaining a constant phase on the phase modulated pulse train output from phase counter 51. Both phase counter 51 and resolver 36 are adapted to provide outputs which are of precisely the same pulse rate, and in phase, under these conditions. Accordingly, there is a zero error signal output from phase discriminator 38 and the cutting element 9 remains motionless. However, if a pulse rate output from function generator 57 does appear on leads 59 and 63, and therefore a pulse train representing a command velocity is fed into command phase counter 51, then the pulses on lead 63, as well as the clock pulses on lead 46, are counted by phase counter 51. If the direction of motion commanded by the programmed tape is in a negative direction, the pulses on lead 63 are subtracted from the block pulses in the command phase counter. Whether the direction is positive or negative with respect to the Z coordinate, is indicated to command phase counter 51 by a signal applied from the input equipment 41 along leads 42, 65 and 66. The addition or subtraction of pulses in the command phase counter 51 has the net effect of either advancing or retarding the phase of the output pulses from the phase counter on lead 39, respectively, relative to the output pulse train from the synchro resolver 36 on lead 37. Accordingly, position servo 29 drives the Z-axis feed mechanism in the appropriate direction and at a rate proportional to the error signal developed in discriminator 38. As Z-axis carriage 6 continues its motion, it will eventually traverse the entire distance required for the specific cutting operation. When this distance is completed, it is recognized in the Z-axis distance counter 62 and a blocking signal is generated therefrom along lead 73. This blocking signal is applied to command phase counter 51 in a manner so as to stop the input thereto from function generator 57. When this happens, pulse rate signals can no longer be added to the clock pulse rate in command phase counter 51, with the result that the phase of the output from phase counter 51 can no longer be changed.

The tool control section 22 so far described is all fully disclosed in the above identified patent, U.S. Patent No. 3,173,001. That portion of the control located within the box 23 in FIGURE 3 is the thread chasing control attachment of this invention. Essentially, this latter control consists of the auxiliary synchronous motor 17 controlled from the numerical input data equipment 41, the thread position synchronizer or proximity switch 19 and the feed hold and flip-flop control circuits operative between the pulse rate divider 50 and the velocity command 49 of the tool position control circuit.

Referring now to FIGURE 4, it will be seen that the main drive motor 13 and the synchronous thread cutting motor 17 are connected in parallel and are both driven from a 440 volt AC power source. Normally open contacts MD-1 of relay MD and MSK-1 of relay MSK are connected across the power supply leads to the main drive motor 13 and thread cutting motor 17 respectively. These relays, MD and MSK, must be energized before either the main drive motor 13 or the thread cutting motor, respectively, is energized. The control of these relays is in turn controlled by the programming of the tape or data input to the numerical input data equipment 41.

If thread chasing is to be programmed into this control, two word addresses must be programmed onto the tape. The first is a G08 function and the second is an M12 function. The G08 word address on the tape is operable to switch the two axes tool feed control section 22 of the machine into thread cutting mode and the M12 address is effective to switch the spindle drive into thread cutting mode. When both of these word addresses are inserted into the numerical input data equipment 41, the control is conditioned for thread chasing. To change the machine from the generalized description of this thread chasing mode of operation and back into normal contouring or turning, an M13 word address is programmed into the machine to switch the spindle drive out of thread cutting mode as is more fully explained hereinafter.

Referring now to FIGURE 5, it will be seen that a normally closed feed hold contact FH-1 of a feed hold relay FH is inserted in lead 53 between the pulse rate divider 50 and the velocity command 49. This contact is normally closed and is opened only when it is desired to hold up an input signal to the tool position control until some predetermined condition is met; in this case until the spindle 18 is in a preset or predetermined position.

The relay FH for controlling contact FH-1 is controlled by a conventional flip-flop control circuit 110. This flip-flop circuit 110 has four inputs; a set steering input 111, a set trigger input 112, a reset trigger input 113, and a reset steering input 114. One of the outputs of flip-flop 110 is a self-steering signal connected by lead 117 to input contact 111. Set trigger input 112 is connected to the numerical input data equipment 41 so as to receive a G08 or thread chasing input command. Reset trigger input 113 is connected by a lead 119 with a conventional inverter 120. A 6 volt input to inverter 120 is supplied through resistor 121 and lead 122 to the input of inverter 120. Also connected to the input lead 122 of inverter 120 is a lead 123 connected to ground through a normally open contact PSR–1 of relay PSR.

The reset steering contact 114 is connected to the count block command of the numerical input data equipment 41. This count block contact is energized whenever all of a block of command information for a selected function has been read out of the input medium. In other words, when all of the information to command a selected function has been read off of the numerical input tape or other information source by the numerical input data equipment 41, a count block signal is sent out indicating that the machine may now proceed to perform the commanded function.

The operation of the flip-flop circuit 110 is as follows: Upon programming of a GO8 (thread-cutting mode) into the numerical input data equipment 41, a GO8 signal is received at the set trigger input contact 112. This sets the flip-flop 110 and energizes the feed hold relay FH connected by lead 115 to one of the flip-flop 110 outputs. Energization of the feed hold relay FH, opens the normally closed contact FH–1 in lead 53 between the pulse rate divider 50 and the velocity command 49. Thus, the signal to the tool position control of the control system is held until the proximity switch 19 indicates that the spindle is in the correct position to release the tool feed. When this occurs, the normally open contact PSR–1 of relay PSR closes. Closing of contact PSR–1, grounds the input to inverter 120 with the result that a six volt pulse is transmitted to reset trigger 113. This results in resetting the flip-flop 110 so that the relay FH is again de-energized. De-energization of the relay FH closes the normally closed contact FH–1, releasing the velocity command signal to the tool control section.

As was mentioned above, to program a thread-cutting mode into the machine, an M12 function must also be programmed into the numerical input data equipment 41 as well as the GO8. Referring back to FIGURE 4, it will be seen that the programming of an M12 into the machine, closes the normally open contact M12–1 between leads 125 and 126. This completes a circuit to thread cutting relay TSK via lead 125, normally closed contact M13–1, contact M12–1 and lead 126. An arc suppression diode 129 is connected in parallel with relay TSK across lead 126. Since the M12 programming signal is only a momentary or pulse type signal, a holding contact TSK–1 is provided in parallel with relay contact M12–1 so as to hold the relay TSK energized.

Energization of the thread chasing relay TSK results in the drive to the main drive motor 13 being shut off while the synchronous thread chasing motor 17 is started up. To shut off the main drive motor, normally closed contact TSK–2 of relay TSK is opened in lead 130 between 110 volt AC power source leads 131, 132. This results in the de-energization of the relay MD and opening of contacts MD–1 in the 440 volt AC power source to the main drive motor. Energization of the relay TSK also results in a circuit being completed to the relay MSK in lead 134 between the leads 131, 132. This latter circuit is completed by the closing of normally open contact TSK–3 through the normally closed contact MD–2. Contact MD–2 is provided to ensure that the thread chasing synchronous motor 17 is always de-energized when the main drive motor 13 is energized. A similar safety contact, MSK–2, is provided in lead 130 to insure that the main drive motor is never energized so long as the synchronous thread-cutting motor is energized. Energization of the relay MSK closes the normally open contacts MSK–1 in the leads to the synchronous thread-chasing motor 17. Thus, upon programming of an M12 function, the main drive motor 13 is de-energized and the thread chasing motor 17 is energized.

For purposes of arc suppression, RC arc suppression circuits 140, 141 are provided in parallel with both the relay MD and the relay MSK in leads 130 and 134 respectively.

Upon energization of the thread cutting relay TSK, normally open contact TSK–4 in lead 135 is closed. This conditions the proximity switch relay PSR for energization upon closing of the proximity switch 19 attached to the spindle 18. When the spindle 18 is at its known or pre-set position, the proximity switch 19 closes completing or pulsing the proximity switch relay PSR with a voltage supplied between a −18 volt and a +6 volt contacts 136 and 137 respectively. An RC time delay drop out circuit 138 is provided in parallel with the proximity switch PSR so as to ensure that the relay remains energized long enough to pulse the flip-flop circuit. Energization of the relay PSR closes the normally open contact PSR–1 in lead 123 (FIGURE 5) to the flip-flop circuit 110. This results in the reset trigger contact 113 of the flip-flop circuit 110 being pulsed to reset the flip-flop circuit and de-energize the feed hold relay FH. As a result, the feed hold contact FH–1 opens in lead 53 between the pulse rate divider 50 and the velocity command 49 so that the command velocity pulses are released to the function generated and the tool movement is initiated.

When the thread chasing function is stopped and a new function is programmed into the machine, an M13 word address must be programmed to initiate energization of the main drive motor 13 and de-energization of the thread chasing motor 17. An M13 word address programmed into the numerical input data equipment 41 results in a normally closed contact, M13–1 (FIGURE 4) being opened so as to de-energize the thread chasing relay TSK. This causes the closing of the normally closed contact TSK–2 with the result that the main drive relay MD is energized and the contacts MD–1 in the circuit to the main drive motor closed. Simultaneously, the normally open contact TSK–3 is opened so that the thread chasing motor relay MSK is de-energized and the contacts MSK–1 in the circuit to the thread chasing motor are opened. The normally open contact TSK–4 is also opened so that the proximity switch relay circuit is de-commissioned until another thread chasing mode is programmed into the machine.

*Operation*

Briefly, the operation of the thread chasing control attachment of this invention is as follows. Upon programming of a GO8 and an M12 function into the numerical input data equipment 41, the control circuit is conditioned for thread chasing. This causes the main drive motor 13 to be deenergized and the thread chasing motor 17 to be energized so as to rotate the spindle at a predetermined speed which is a multiple of line frequency. Simultaneously, the pulse signals from the system generator or clock 43 for control of the tool movement in both the X and Z plane are temporarily held up by interruption of the circuit between the pulse rate divider 50 and the velocity command 49. This is accomplished by opening of the feed hold contact FH–1, upon energization of the relay FH. This relay FH is energized by the setting of the flip-flop circuit 110 upon receipt of a GO8 programmed signal from the numerical input data equipment 41. When the proximity switch 19 attached to the spindle 18 reaches a predetermined angular position, it closes the proximity switch, energizing the proximity switch relay PSR. This causes the contact PSR–1 to be closed to reset the flip-flop circuit thus de-energizing the feed hold relay FH and closing the normally closed contact FH–1. This releases the temporarily held pulse signals from the pulse rate divider 50 to the velocity command 49 so that tool movement is initiated with the tool in a predetermined or known position relative to the angular position of the spindle 18. The tool is then moved a predetermined linear distance along the Z axis depending upon the number of pulses allowed to pass to the Z axis position servo 29, and at a rate determined by the rate of the pulses supplied to the position servo.

While only a single embodiment of the invention has been disclosed and described herein, those skilled in the art to which this invention pertains will readily appreciate numerous changes and modification which may be made in the invention without departing from the spirit thereof. Therefore, I do not intend to be limited except by the scope of the appended claims.

Having described my invention, I claim:

1. In a numerically controlled machine having a movable tool operable to cut a rotating workpiece, said machine having a main drive motor for rotating said workpiece and means for moving said tool relative to said rotating workpiece while said tool is engaged with said workpiece to effect cutting of said workpiece, the improvement which comprises, thread chasing means for controlling the movement of said movable tool relative to said rotating workpiece so as to cut threads upon said workpiece in response to numerical control data, said thread chasing means including means for operatively disconnecting said main drive motor from said workpiece and for substituting an auxiliary speed regulator means for rotating said workpiece at a predetermined rotational velocity, said tool control means being operable to move said tool longitudinally relative to said rotating workpiece at a preselected speed to cut a preselected thread lead upon said workpiece while said workpiece is being driven by said auxiliary speed regulating means, said tool moving means when cutting a thread being responsive to numerical input data and independent of the rotational velocity of said workpiece, and synchronizing means for initiating tool movement in response to said numerical input data only at a preselected angular position of said workpiece.

2. The machine of claim 1 wherein said auxiliary speed regulator means for rotating said workpiece comprises a synchronous motor.

3. The machine of claim 1 wherein said synchronizing means includes a feed hold circuit for initiating tool movement in response to said numerical input data only at a preselected angular position of said workpiece.

4. In a numerically controlled machine having a movable tool operable to cut a rotating workpiece, said machine having a main drive motor for rotating said workpiece and control means for moving said tool while said tool is engaged with said workpiece to effect cutting of said workpiece, said control means including a pulse generator, a velocity command device operable to receive pulses from said pulse generator and, in response to input data, to modify the rate of said pulses to control the speed of movement of said tool, a function generator operable to receive said modified pulses from said velocity command device and, in response to input data, to resolve said pulses into one of more components for movement of said tool in one or more directions, the improvement which comprises, thread chasing means for controlling the movement of said movable tool relative to said rotating workpiece so as to cut threads upon said workpiece in response to numerical control data, said thread chasing means including means for operatively disconnecting said main drive motor from said workpiece and for substituting an auxiliary speed regulator means for rotating said workpiece at a predetermined rotational velocity, said tool control means, including said pulse generator and said velocity command device and said function generator, being operable to move said tool longitudinally relative to said rotating workpiece at a preselected speed to cut a preselected thread lead upon said workpiece while said workpiece is being driven by said auxiliary speed regulator means, said tool control means when cutting a thread being independent of the rotational velocity of said workpiece, and synchronizing means for initiating tool movement in response to said numerical input data only at a selected angular position of said workpiece.

5. The numerically controlled machine of claim 4 wherein said auxiliary drive means comprises an electrical synchronous motor dependent upon line frequency for control of the speed of said motor.

6. The numerically controlled machine of claim 5 wherein said synchronizing means includes a feed hold circuit for withholding the input of pulses from said pulse generator to said function generator until said workpiece is in a predetermined rotational position.

7. A system for controlling the movement of a movable tool relative to a rotating workpiece in response to numerical input data, said system including data input means, tool control means responsive to said data input means for controlling movement of said tool along two different axes erative to said workpiece, means including a main drive motor responsive to said data input means for rotating said workpiece, the improvement comprising thread cutting means responsive to said data input means for cutting a thread upon said workpiece, said thread cutting means including means for rendering said main drive motor inoperative and speed regulator means for rotating said workpiece at an accurate predetermined speed while said main drive motor remains inoperative, synchronizing means for synchronizing the rotational movement of said workpiece relative to the movement of said movable tool along one of said axes, said synchronizing means including a proximity switch operatively connected to said workpiece so as to determine the angular position of said workpiece, said synchronizing means including a feed hold circuit for withholding tool feed control signals to said tool control means until said workpiece is in a preselected position, and a flip-flop circuit for controlling said feed hold circuit, said flip-flop circuit being operative to actuate said feed hold circuit upon receipt of a thread cutting function signal from said data input means and to release said feed hold circuit upon receipt of a signal from said proximity switch.

References Cited

UNITED STATES PATENTS 3,174,367   3/1965   Lukens _____ 82—5

HARRISON L. HINSON, *Primary Examiner.*